US008749642B2

(12) United States Patent
Lindsay et al.

(10) Patent No.: US 8,749,642 B2
(45) Date of Patent: Jun. 10, 2014

(54) CAMERA POSE CORRECTION

(75) Inventors: Richard Arthur Lindsay, Stowmarket (GB); Philip Christopher Dalgoutte, Bury St. Edmunds (GB)

(73) Assignee: The Vitec Group PLC (GB)

( * ) Notice: Subject to any disclaimer, the term of this patent is extended or adjusted under 35 U.S.C. 154(b) by 717 days.

(21) Appl. No.: 13/082,873

(22) Filed: Apr. 8, 2011

(65) Prior Publication Data
US 2011/0249152 A1 Oct. 13, 2011

(30) Foreign Application Priority Data
Apr. 12, 2010 (GB) .................................. 1006062.2

(51) Int. Cl.
H04N 5/225 (2006.01)
H04N 5/217 (2011.01)

(52) U.S. Cl.
USPC ........................................ 348/207.1; 348/241

(58) Field of Classification Search
USPC .............. 348/169–172, 207.1–207.99, 215.1, 348/216.1, 217.1, 218.1, 219.1, 220.1, 241
See application file for complete search history.

(56) References Cited

U.S. PATENT DOCUMENTS

| 5,525,883 | A * | 6/1996 | Avitzour ........................ 318/587 |
| 5,911,767 | A * | 6/1999 | Garibotto et al. ............... 701/28 |
| 8,174,568 | B2 * | 5/2012 | Samarasekera et al. ....... 348/113 |
| 8,279,266 | B2 * | 10/2012 | Theobald ......................... 348/36 |
| 8,538,671 | B2 * | 9/2013 | Lee et al. ....................... 701/300 |
| 2003/0216834 | A1 * | 11/2003 | Allard ............................ 700/245 |
| 2004/0227820 | A1 | 11/2004 | Nister |
| 2005/0078178 | A1 * | 4/2005 | Brown et al. .................. 348/139 |
| 2007/0253618 | A1 | 11/2007 | Kim et al. |
| 2008/0267453 | A1 * | 10/2008 | Avrahami ...................... 382/103 |
| 2009/0180668 | A1 * | 7/2009 | Jones et al. .................... 382/103 |
| 2010/0073490 | A1 * | 3/2010 | Wang et al. ............... 348/207.11 |
| 2010/0220173 | A1 * | 9/2010 | Anguelov et al. ............... 348/36 |
| 2011/0264303 | A1 * | 10/2011 | Lenser et al. ..................... 701/2 |
| 2012/0120072 | A1 * | 5/2012 | Se et al. ......................... 345/420 |

FOREIGN PATENT DOCUMENTS

| GB | 2411532 A | 11/2008 |
| WO | WO 2008/143523 A1 | 11/2008 |

OTHER PUBLICATIONS

Search Report issued on Sep. 20, 2010 by the UK Intellectual Property Office for the corresponding UK patent application No. GB1006062.2.

* cited by examiner

Primary Examiner — Roberto Velez
Assistant Examiner — Tuan Le
(74) Attorney, Agent, or Firm — Myers Bigel Sibley & Sajovec, P.A.

(57) ABSTRACT

The invention concerns correcting an error in an estimated pose of a moveable camera. The camera is at least a part of a camera system that generates an output image on the basis of the camera pose. Incremental pose measurements for the camera are taken over time and a pose of the camera using the incremental pose measurements is estimated, the estimated camera pose having an error. A pose correction is determined on the basis of the difference between an absolute pose measurement for the camera and the estimated camera pose. A rate of change in the camera image caused by a change in the camera is monitored. A parameter of the camera system is periodically adjusted based on the incremental pose measurements. The adjustment is further set in order to effect the pose correction so as to correct for the estimated camera pose error and the pose correction is effected at a rate based on the monitored rate of change in the camera image.

13 Claims, 2 Drawing Sheets

CAMERA POSE CORRECTION

RELATED APPLICATION

The present application claims priority under 35 U.S.C. §119 to Great Britain Patent Application No. 1006062.2, filed Apr. 12, 2010 in the Great Britain Intellectual Property Office, the disclosure of which is incorporated herein by reference in its entirety.

TECHNICAL FIELD OF THE INVENTION

The present invention relates to a method for correcting an error in an estimated pose of a moveable camera and an associated camera control system.

BACKGROUND TO THE INVENTION

Existing camera systems include features to track the pose of a camera. The pose may comprise the position of the camera, orientation of the camera or both.

Known technologies for monitoring or tracking the position of a camera use dead-reckoning techniques. These provide an incremental measurement of pose, based on an initial absolute pose reference. However, these are prone to error, which accumulates over time. This error can have a significant effect.

In a Virtual Reality system, the image taken by the camera is combined with virtual image to generate an output image. The accumulated error would manifest itself as a misalignment between the camera-generated image and rendered virtual image when the two are combined.

In a robotic camera motion control system this error would manifest itself as a framing error. In other words, the instruction provided by the camera controller would be based on an incorrect estimated position for the camera and result in an incorrect movement.

An absolute pose measurement technology for the camera would be advantageous. It would be desirable for absolute pose measurement to replace the incremental dead-reckoning. However, existing absolute pose measurement systems do have some disadvantages that preclude this. Some absolute pose measurement systems are incapable of delivering a sufficiently high update rate required for camera motion tracking and control systems. Also, absolute pose measurement systems that use reference targets can have problems when the targets are occluded by other items. In such case, the absolute pose measurement system is unable to determine the pose of the camera at all. Moreover, an absolute pose measurement system working independently of any odometric dead-reckoning system can also exhibit significant jitter.

SUMMARY OF THE INVENTION

Against this background, there is provided a method for correcting an error in an estimated pose of a moveable camera. The camera is a part or the whole of a camera system that generates an output image on the basis of the camera pose. The method comprises: taking incremental pose measurements for the camera over time and estimating a pose of the camera using the incremental pose measurements, the estimated camera pose having an error; determining a pose correction on the basis of the difference between an absolute pose measurement for the camera and the estimated camera pose; monitoring a rate of change in the camera image caused by a change in the camera; and periodically adjusting a parameter of the camera system based on the incremental pose measurements. The adjustment is further set in order to effect the pose correction so as to correct for the estimated camera pose error. The pose correction is then effected at a rate based on the monitored rate of change in the camera image.

In other words, an incremental pose measurement technology, such as dead-reckoning, is combined with an absolute pose measurement system. However, the absolute pose measurement system provides a measurement with a relatively low frequency in comparison with the incremental pose measurement. As a consequence, the incremental pose measurement still accumulates an error, which results in an accumulating error in the output images. The camera pose can comprise the camera position, camera orientation or both.

The invention determines a value for the error in the incremental pose measurement and adjusts the camera system in order to compensate for this error. This correction is effected at a rate based on the rate of change of the camera image. These are typically images generated by the camera. By so doing, the correction is implemented such that the perception of the viewer that the correction is being implemented is reduced. Desirably, the viewer does not notice that the correction in position is being implemented.

In summary, the system can be seen to bias the dead-reckoning incremental measurement of position towards that of the absolute system at a rate which is a function of the rate of change of the image caused by a change in a camera parameter. This function effectively modifies (increases or decreases) the image velocity by an amount that has been deemed invisible to the viewer to tend the incremental pose data to the true position as measured by the absolute position.

In some embodiments, the incremental pose measurements comprise position measurements, the estimated camera pose comprises an estimated camera position, and the absolute pose measurement comprises an absolute camera position. Additionally or alternatively, the incremental pose measurements comprise orientation measurements, the estimated camera pose comprises an estimated camera orientation, and the absolute pose measurement comprises an absolute camera orientation.

In the preferred embodiment, the step of monitoring a rate of change in the camera image comprises at least one of: monitoring a rate of translation in the camera image caused by a change in the camera system; and monitoring a rate of rotation of the camera image caused by a change in the camera system. This can optionally be effected by analysis of the image generated by the camera. This is preferably digital image analysis.

In an embodiment, the step of periodically adjusting a parameter of the camera system comprises controlling at least one of: the camera system position; and an orientation of the camera system, to a desired setting. In this case, the camera motion control system corrects for the framing error introduced by the incremental pose measurement system.

In another embodiment, the method further comprises generating the output images for the camera system on the basis of the estimated camera pose, using images generated by the camera. Then, the step of periodically adjusting a parameter of the camera system comprises adjusting the generation of output images. In this approach, the correction may be effected by adjusting the virtual image that is combined with the image generated by the camera.

Advantageously, setting the adjustment in order to effect the pose correction comprises setting the adjustment on the basis of the incremental pose measurements and a proportion of the pose correction. Then, the proportion of the pose correction is based on the monitored rate of change in camera image. One way of doing is this is that the proportion of the pose correction is directly proportional to the monitored rate of change in camera image. This is a linear relationship. Alternatively, the relationship between the proportion of the pose correction and the monitored rate of change in camera image can be non-linear or based on other translation rules which may include thresholds, hysteresis or other control relationships.

In the preferred embodiment, the step of monitoring a rate of change in the camera image comprises determining a rate of change in the estimated camera pose. This technique can be used as an alternative or in addition to the digital processing approach noted above.

Beneficially, when the camera system comprises the camera coupled to a mounting, the step of determining a rate of change in the estimated camera pose may comprise determining a rate of change in the mounting pose. A change in the pose of the mounting causes a change in the pose of the camera and can therefore cause a change in the camera image. Optionally, the mounting can comprise at least one of: a pan and tilt head; a pedestal; a cable camera suspension system; and a portable camera mount.

In some embodiments, the step of monitoring a rate of change in the camera image caused by a change in the camera system comprises determining a rate of change in at least one of: a position for the camera; an orientation for the camera; a zoom parameter for the camera; and a focus parameter for the camera. By determining one or more of these rates of change, the rate of change in the camera image caused by a change in the camera can be inferred.

In a further aspect, the present invention can be found in a camera control system comprising: a camera system comprising a camera, the camera system being arranged to generate an output image on the basis of the camera pose; a first pose measurement device, arranged to take incremental pose measurements for the camera over time and to estimate a pose of the camera using the incremental pose measurements, the estimated camera pose having an error; an absolute pose measurement device, arranged to take an absolute pose measurement for the camera; a monitoring device, arranged to monitor a rate of change in the camera image caused by a change in the camera; and a controller arranged to determine a pose correction on the basis of the difference between the absolute pose measurement and the estimated camera pose and to periodically adjust a parameter of the camera system based on the incremental pose measurements. The adjustment is further set in order to effect the pose correction so as to correct for the estimated camera pose error. The pose correction is effected at a rate based on the monitored rate of change in camera image. The present invention also optionally comprises system features to implement the corresponding method steps described herein.

BRIEF DESCRIPTION OF THE DRAWINGS

An embodiment of the present invention will now be described, by way of example only, with reference to the accompanying drawings, in which.

DETAILED DESCRIPTION OF A SPECIFIC EMBODIMENT

Figure 1:
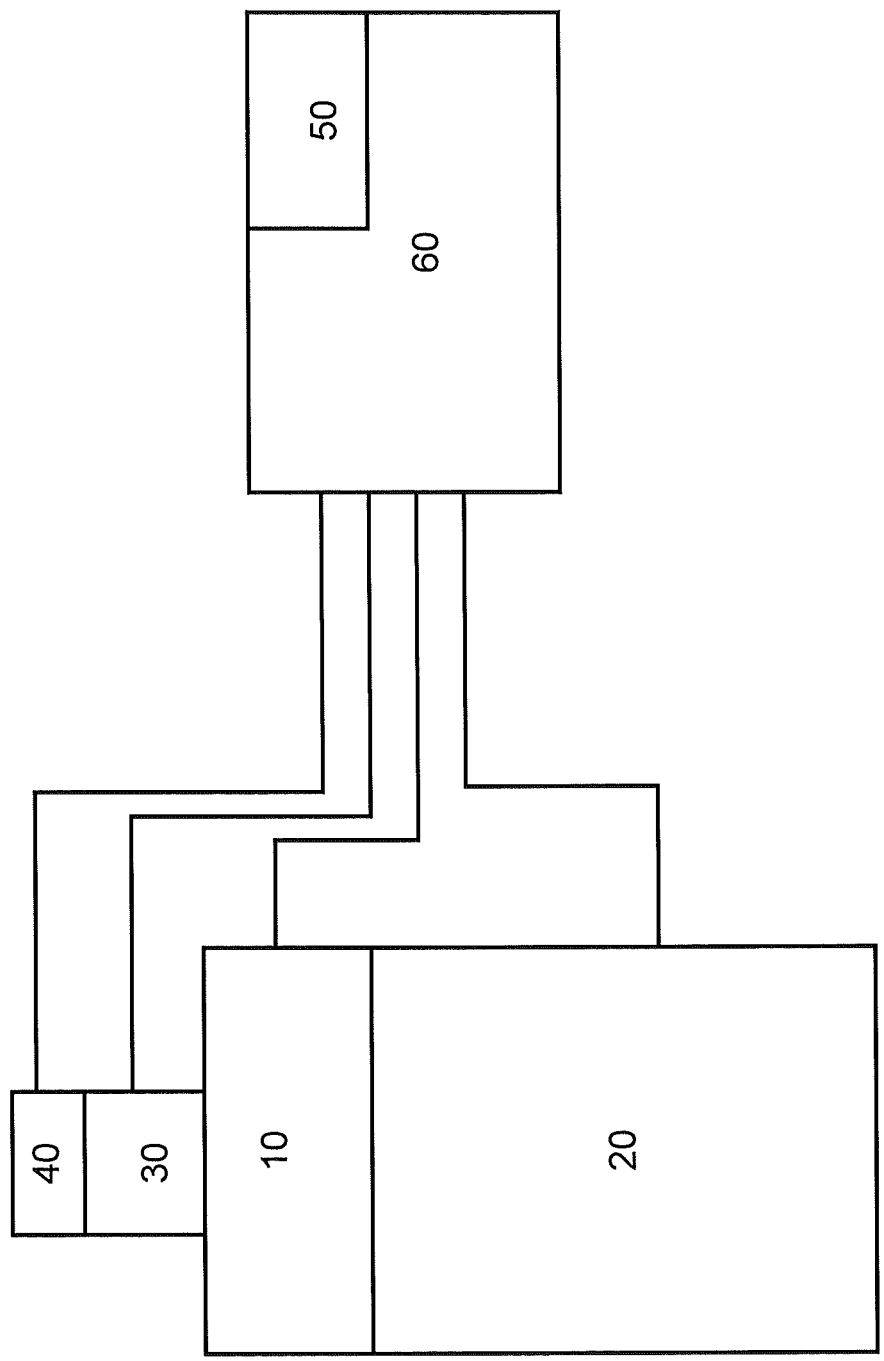
FIG. 1 shows a schematic diagram of a camera control system according to the present invention.

Referring first to FIG. 1, there is shown a schematic diagram of a camera control system according to the present invention. The camera control system comprises: a camera 10; a mounting 20; an incremental pose measurement device 30; an absolute pose measurement device 40; a monitoring device 50; and a controller 60.

The camera 10 is coupled or affixed to the mounting 20. The mounting may comprise either or both of a pan and tilt head or a pedestal, or it may be a cable camera suspension system, or a portable camera mount such as a hand-held or body-supported mount could be used. The camera 10 and mounting 20 form part of a camera system. The camera 10 provides images to a central system (not shown). The camera 10 also includes encoders which sense its zoom and focus parameters.

The camera control system also has an incremental pose measurement device 30 for the camera 10. The incremental pose measurement device 30 includes a dead-reckoning odometric device which incrementally determines a two-dimensional position for the camera 10 and an orientation angle for the camera within these two dimensions. These two dimensional measurements do not include height. Separate encoders can be used to measure height and other pose-related measurements.

The camera control system further comprises an absolute pose measurement device 40 for the camera 10. This has a significantly lower measurement frequency than the incremental pose measurement device 30. A laser tracking system is used as part of the absolute pose measurement device 40, which is designed to determine position by recognising, tracking and computing distance from markers at known reference locations. In general, such a device can provide an absolute position measurement with an interval of at least 140 ms, although it may be significantly greater.

The incremental pose measurement device 30 and absolute pose measurement device 40 provide their respective measurements to the controller 60. Using the incremental pose measurements, an estimated camera pose can be determined.

The monitoring device 50 determines a rate of change in the image generated by the camera 10 caused by a change in the camera 10. In particular, the change in the camera 10 comprises a change in camera pose, although it can include another change in the camera, such as a change in zoom or focus.

The controller 60 then adjusts a parameter of the camera system, which might include the camera 10, mounting 20 or the output images generated by the camera system, based on the incremental pose measurements and absolute pose measurements. In particular, whilst the controller 60 mainly uses the incremental pose measurements for determining the instantaneous position, orientation or both of the camera 10, it also uses the absolute pose measurement to correct for the error in the instantaneous measurements.

When an absolute pose measurement is determined, the error in the estimated camera pose can be established and the controller 60 can determine a pose correction. The adjustment made by the controller is also set in order to effect the pose correction so as to correct for the estimated camera pose error. The adjustment is made so that the pose correction is effected at a rate based on the rate of change in the camera image determined by the monitoring device 50. In this way, any error in the output images is corrected without the viewer perceiving this correction significantly.

Figure 2:
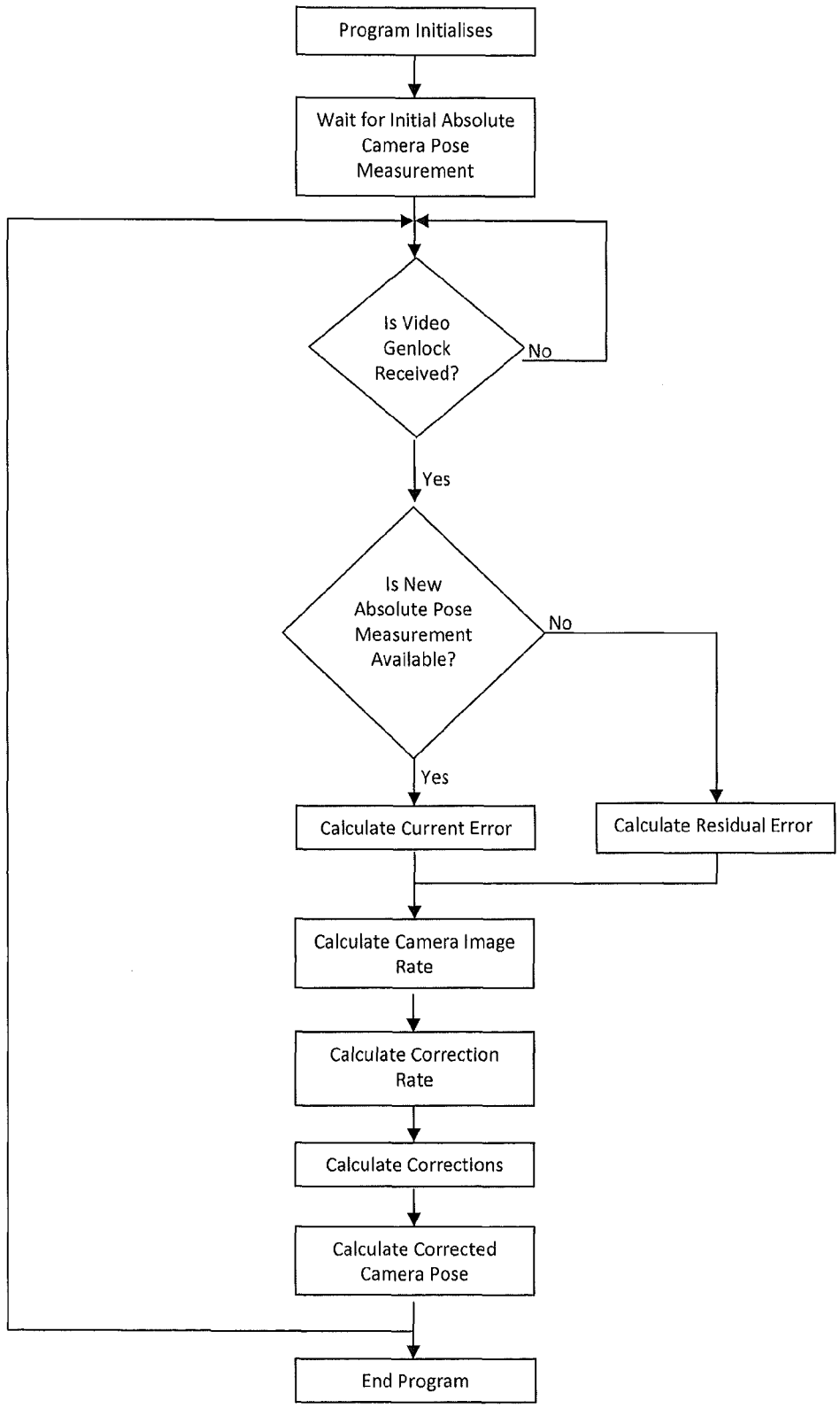
FIG. 2 shows a flowchart illustrating an approach for operating the camera control system of FIG. 1 according to the present invention.

An approach of operating the camera control system will now be described with reference to FIG. 2, in which is shown a flowchart illustrating an algorithm in line with this approach. The algorithm is desirably embodied in software in the controller 60.

The program is initialised and in a first step, an origin absolute camera pose measurement is made. This provides a reference point for the dead-reckoning system 30.

The algorithm is iterative and provides a cyclic correction. Its timing is set according to a synchronisation signal. A Genlock signal is used for this synchronisation. The Genlock signal derived from a PAL video source provides 50 Hz timing capability, when derived from an NTSC video source this is 60 Hz. Each time a Genlock signal is received, an incremental pose measurement is taken. Consequently, the incremental pose measurement is provided significantly more frequently than the absolute pose measurement. The incremental pose measurements are stored together with an associated timestamp in an array.

Once a Genlock signal is received, the controller 60 checks whether an absolute pose measurement has been generated since the last correction cycle. The absolute pose measurement device 40 does not necessarily generate a measurement at a fixed interval. Moreover, the absolute pose measurement may not necessarily be generated in synchronisation with the incremental pose measurement. In fact, such synchronisation is unlikely. There may also be some latency (possibly 100 ms) between the absolute pose measurement and the incremental pose measurement. The absolute position measurement is therefore also stored with an associated timestamp.

If an absolute pose measurement has been generated since the last correction cycle, the current error is determined. This error is established using the array of incremental pose measurements to determine an estimated pose. The estimated pose is established for the time corresponding with the timestamp of the absolute pose measurement. This timestamp will typically not accord with the timestamp for any of the incremental pose measurements. Thus, the estimated pose is usually determined using linear interpolation from the incremental pose measurements. The error between the estimated pose and the absolute pose measurement is then determined.

If no new absolute pose measurement has been determined since the last correction cycle of the algorithm, a residual error is calculated as the error. This is determined by using the error determined in the previous correction cycle of the algorithm and by accounting for any correction in pose effected during the previous correction cycle.

A camera image change rate is then calculated. This is determined by monitoring the rate of change in pose of the camera (a camera velocity), using the incremental pose measurements, together with the change in field of view and focal distance of the camera lens. These establish the rate of change in camera pose and the rate of change in camera focus and zoom. The rate of change in camera image caused by changes to the camera is thereby determined. The gradient of a curve fit of incremental pose measurements recorded over a short-term period can be used.

The rate of change in camera image is subsequently used to determine a rate at which the error in camera pose should be effected. The rate at which the error in camera pose is effected is established using a model which takes into account the viewers perception and relates this to the rate of change in camera image. Typically, this model is non-linear. The error can thereby be compensated or corrected for without the image viewer being aware.

The correction to be applied in the camera cycle is then calculated using the pose correction established from the determined error and the derived correction rate. As a final step in the cycle, the estimated camera pose is then updated with the correction applied. This updated estimated camera pose is then used for control purposes or for generated composite images in a Virtual Reality system.

Although one embodiment of the present invention has been described above, the skilled person will contemplate various modifications.

Whilst a Genlock signal has been used for synchronisation, other synchronisation approaches can additionally or alternatively be used. Also, although linear interpolation is used for determining the estimated pose, other interpolation techniques can be used.

In the embodiment described above, the rate of change in camera image caused by changes to the camera is determined by monitoring the rate of change in camera parameters, such as pose, zoom and focus. Alternatively, image processing can be used to determine this rate of change.

The model which relates the rate of change in camera image to the rate at which the error in camera pose is effected can linear or use a combination of linear, non-linear, threshold and other translation rules.

The invention claimed is:

1. A method for correcting an error in an estimated pose of a moveable camera, the camera being at least a part of a camera system that generates an output image on the basis of the camera pose, the method comprising:
    taking incremental pose measurements for the camera over time and estimating a pose of the camera using the incremental pose measurements, the estimated camera pose having an error;
    determining a pose correction on the basis of the difference between an absolute pose measurement for the camera and the estimated camera pose;
    monitoring a rate of change in the camera image caused by a change in the camera; and
    periodically adjusting a parameter of the camera system based on the incremental pose measurements, the adjustment further being set in order to effect the pose correction so as to correct for the estimated camera pose error, the pose correction being effected at a rate based on the monitored rate of change in the camera image.

2. The method of claim 1, wherein the incremental pose measurements comprise at least one of position measurements and orientation measurements, the estimated camera pose comprises at least one of an estimated camera position and an estimated camera orientation, and the absolute pose measurement comprises at least one of an absolute camera position and an absolute camera orientation.

3. The method of claim 1, wherein the step of monitoring a rate of change in the camera image comprises at least one of: monitoring a rate of translation in the camera image caused by a change in the camera system; and monitoring a rate of rotation of the camera image caused by a change in the camera system.

4. The method of claim 1, wherein the step of periodically adjusting a parameter of the camera system comprises controlling at least one of: the camera system position; and an orientation of the camera system, to a desired setting.

5. The method of claim 1, further comprising:
    generating the output images for the camera system on the basis of the estimated camera pose, using images generated by the camera; and
    wherein the step of periodically adjusting a parameter of the camera system comprises adjusting the generation of output images.

6. The method of claim 1, wherein setting the adjustment in order to effect the pose correction comprises setting the adjustment on the basis of the incremental pose measurements and a proportion of the pose correction, the proportion of the pose correction being based on the monitored rate of change in camera image.

7. The method of claim 6, wherein the proportion of the pose correction is directly proportional to the monitored rate of change in camera image.

8. The method of claim 1, wherein the step of monitoring a rate of change in the camera image comprises determining a rate of change in the estimated camera pose.

9. The method of claim 8, wherein the camera system comprises the camera coupled to a mounting, and wherein the step of determining a rate of change in the estimated camera pose comprises determining a rate of change in the mounting pose.

10. The method of claim 9, wherein the mounting comprises at least one of: a pan and tilt head; a pedestal; a cable camera suspension system; and a portable camera mount.

11. The method of claim 1, wherein the step of monitoring a rate of change in the camera image caused by a change in the camera system comprises determining a rate of change in at least one of: a position for the camera; an orientation for the camera; a zoom parameter for the camera; and a focus parameter for the camera.

12. The method of claim 1, wherein the step of monitoring a rate of change in the camera image caused by a change in the camera comprises analysis of the image generated by the camera.

13. A camera control system comprising:
a camera system comprising a camera, the camera system being arranged to generate an output image on the basis of the camera pose;
a first pose measurement device, arranged to take incremental pose measurements for the camera over time and to estimate a pose of the camera using the incremental pose measurements, the estimated camera pose having an error;
an absolute pose measurement device, arranged to take an absolute pose measurement for the camera;
a monitoring device, arranged to monitor a rate of change in the camera image caused by a change in the camera; and
a controller arranged to determine a pose correction on the basis of the difference between the absolute pose measurement and the estimated camera pose and to periodically adjust a parameter of the camera system based on the incremental pose measurements, the adjustment further being set in order to effect the pose correction so as to correct for the estimated camera pose error, the pose correction being effected at a rate based on the monitored rate of change in camera image.

* * * * *